J. ISAACS.
TOY.
APPLICATION FILED MAY 13, 1915.
1,152,639.
Patented Sept. 7, 1915.
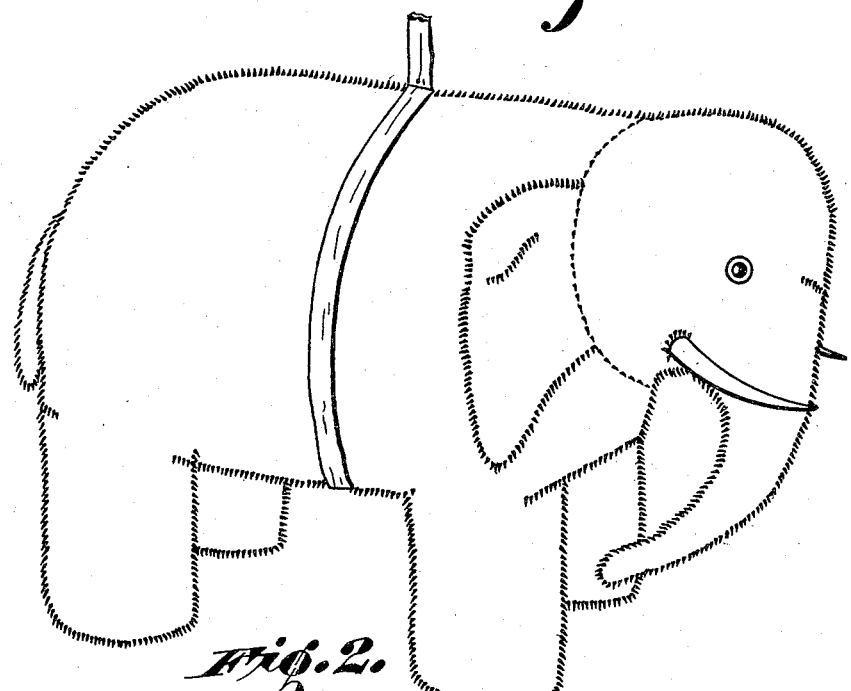
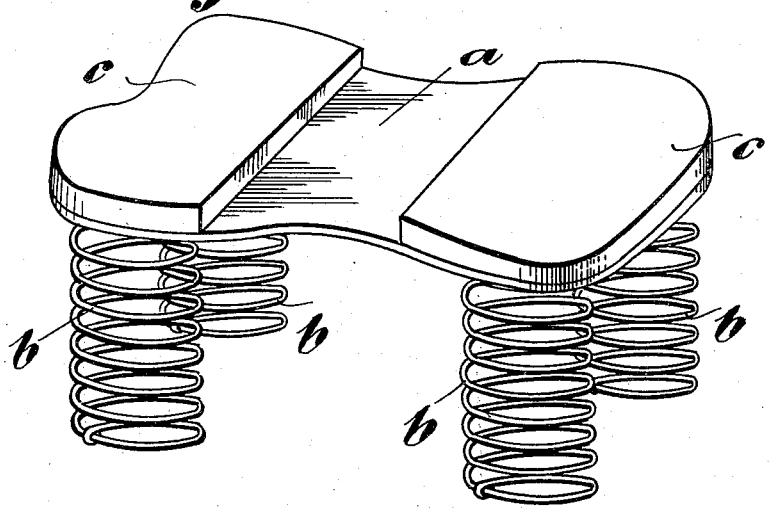

UNITED STATES PATENT OFFICE.

JOSIAH ISAACS, OF BIRMINGHAM, ENGLAND.

TOY.

1,152,639.  Specification of Letters Patent.  Patented Sept. 7, 1915.

Application filed May 13, 1915. Serial No. 27,817.

*To all whom it may concern:*

Be it known that I, JOSIAH ISAACS, a subject of the Kingdom of Great Britain, residing at Highgate Park Works, Alcester street, Birmingham, in the county of Warwick, England, manufacturer, have invented a certain new and useful Improved Toy, of which the following is a specification.

This invention comprises a new or improved toy, and is particularly applicable to the type of toy which comprises a four-legged animal. The invention, however, is applicable to other toys.

According to the present invention a representation of a four-legged animal or other toy to which the invention is applicable, is adapted to jump, move or walk in a life-like or characteristic manner, the means providing for this being simple, and of a character not readily liable to become inoperative or become broken when subjected to the circumstances to which toys are subjected when played with by children.

The present invention is carried out by providing a four-legged animal or other article to which the invention is applicable, with legs which are of a springy character, adapted to contract and expand longitudinally, and which legs are free at their lower extremities and capable of moving forwardly or rearwardly or laterally independently of each other. Each leg may, for instance, be composed of a coiled spring which may be covered with the material with which the body of the animal is covered, and by fastening a string or the like to the back of the animal at a suitable point, the animal can be caused to jump, or walk by intermittently raising and lowering the string, and by drawing it forwardly. The string is advantageously connected to the forepart of the animal so that in lifting it, only the front legs of the animal are raised from the ground, and in slightly drawing the animal forward, as the string is lifted, the body of the animal is drawn forwardly, the rear legs being enabled to bend rearwardly in view of their springy characteristics. After the body of the animal has been allowed to again fall onto all four legs, the rear legs are enabled to move forwardly and regain their normal position. The animal may conveniently be of a character whereby a larger weight is supported by the fore-legs than by the hind legs.

In order that this invention may be clearly understood and readily carried into practice, reference may be had to the appended explanatory sheet of drawings, upon which—

Figure 1 is a perspective view of a representation of an elephant according to the present invention. Fig. 2 illustrates in perspective an internal part in the construction of the article shown in Fig. 1.

In a convenient embodiment of the present invention, as shown in the drawings, the body and head of the elephant may be of ordinary form composed of cloth, or any suitable material, filled with a suitable soft material, and in the lower part of the body a board *a* may be incorporated, under which a layer of the soft filling material may be provided, but which board forms the part to which the legs are fastened. Each leg, in the form of a coiled spring *b*, is fastened at its one extremity to the board rigidly in any suitable manner, as, for instance, by staples, and the springs are covered with the material with which the body is covered. The board *a* may be comprised of a suitably shaped piece of three-ply wood, having transverse wooden strengthening portions *c* at each extremity arranged above the parts to which the springs *b* are connected.

In lieu of coiled springs, other means may be employed for the legs, such as rubber tubular members.

The invention may, for instance, be applied to other toys, such, for instance, as a toy consisting of two dolls connected together. The invention may be applicable to an article having two legs.

What I claim as my invention and desire to secure by Letters Patent is:—

A toy consisting of the representation of a four-legged animal, the body of which may be composed of any suitable outer covering filled with a suitable packing, and in which body a board or member is incorporated extending from front to back, and from side to side of the body, and from which board the upper extremities of coiled springs constituting the legs are secured, such coiled springs being externally covered with material similar to that utilized to cover the body, substantially as and for the purpose set forth.

In witness whereof I have hereunto set my hand in the presence of two witnesses.

JOSIAH ISAACS.

Witnesses:
 ARTHUR HENRY BROWN,
 CHARLES RICHARD RIGBY.

Copies of this patent may be obtained for five cents each, by addressing the "Commissioner of Patents, Washington, D. C."